(12) United States Patent
Currie et al.

(10) Patent No.: US 6,481,365 B1
(45) Date of Patent: Nov. 19, 2002

(54) AIRCRAFT TAIL STAND WARNING SYSTEM

(75) Inventors: Chris J. Currie, Wichita, KS (US);
Jerry D. Cannon, Kechi, KS (US);
Paul A. Posch, Wichita, KS (US); Neil L. Suter, Wichita, KS (US); Israel Ramirez, Wichita, KS (US); Phillip A. Wilson, Derby, KS (US); Kenny Chong, Alhamdra, CA (US)

(73) Assignee: Cessna Aircraft Company, Wichita, KS (US)

( * ) Notice: Subject to any disclaimer, the term of this patent is extended or adjusted under 35 U.S.C. 154(b) by 0 days.

(21) Appl. No.: 09/904,003

(22) Filed: Jul. 13, 2001

(51) Int. Cl.[7] ................................................. G08B 3/00
(52) U.S. Cl. ..................................................... 116/67 R
(58) Field of Search ................................. 116/67 R, 68, 116/82, 281, 283, 137 R; 340/945, 666, 665, 690; 180/290; 403/109.1, 109.6; 248/352, 354.1, 354.5; 244/108, 109, 118.1

(56) References Cited

U.S. PATENT DOCUMENTS

| | | | | |
|---|---|---|---|---|
| 1,018,328 A | * | 2/1912 | Lee et al. ................... | 340/690 |
| 1,737,514 A | * | 11/1929 | Nikolish ................... | 116/67 R |
| 2,532,168 A | * | 11/1950 | Jakoubek .................. | 254/101 |
| 3,051,419 A | * | 8/1962 | Weiland et al. .......... | 244/137.1 |
| 4,042,135 A | * | 8/1977 | Pugh et al. ................ | 214/441 |
| 4,378,093 A | * | 3/1983 | Evans ....................... | 244/137.1 |
| 4,593,871 A | * | 6/1986 | Nichols .................... | 244/129.1 |
| 5,445,352 A | * | 8/1995 | Long ........................ | 248/354.5 |

FOREIGN PATENT DOCUMENTS

DE             3044425 A1  *  6/1982

* cited by examiner

Primary Examiner—Christopher W. Fulton
Assistant Examiner—Tania Courson
(74) Attorney, Agent, or Firm—Edward L. Brown, Jr.

(57) ABSTRACT

A tail support stand for aircraft which sounds an alarm when the tail lowers relative to the stand including a stationary vertical stand which rests on the ground having a passage therethrough, a slidable sleeve positioned in said passage with an aircraft engaging surface on the upper end thereof, the sleeve having a series of longitudinally spaced holes and a removable pin to insert in said holes. A stationary plate attached to the top of the stationary stand with an opening surrounding the sleeve, a movable plate with an opening concentrically positioned over the stationary plate with biasing means positioned between the plates resisting movement of the movable plate and audible aerosol actuated horn positioned between the movable and stationary plates which is activated when the said pin engages and moves the movable plate toward the stationary plate.

7 Claims, 3 Drawing Sheets

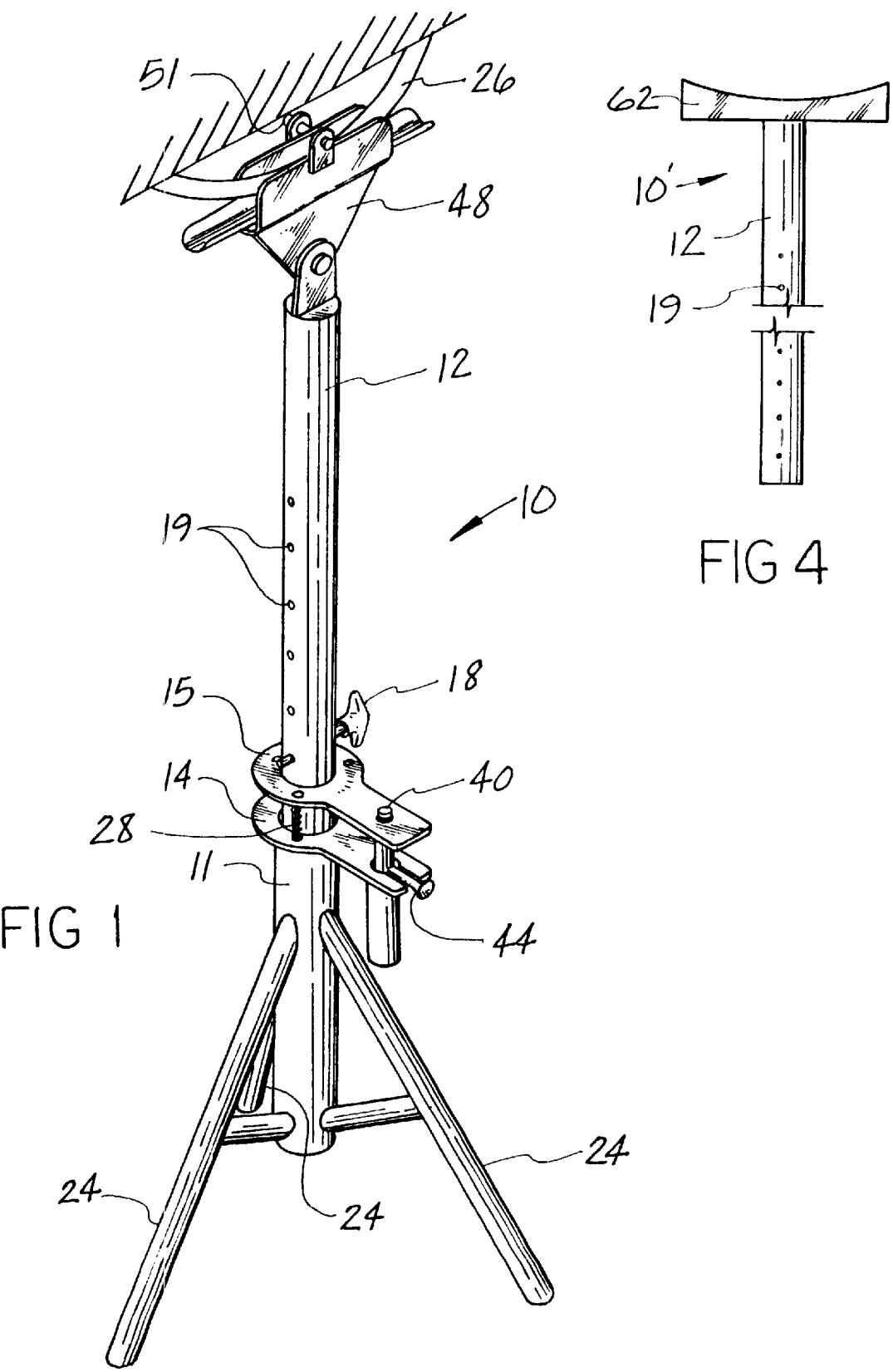

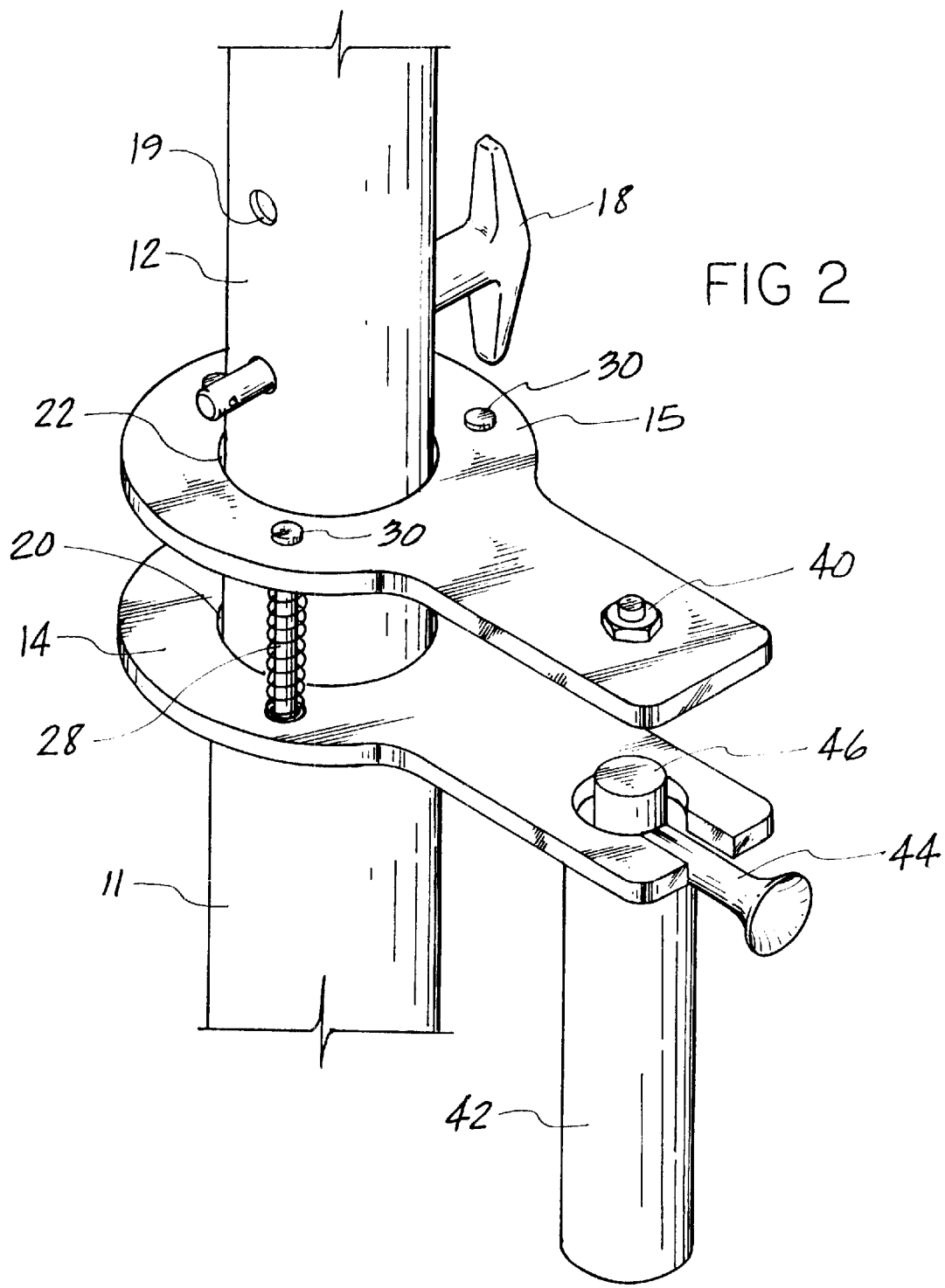

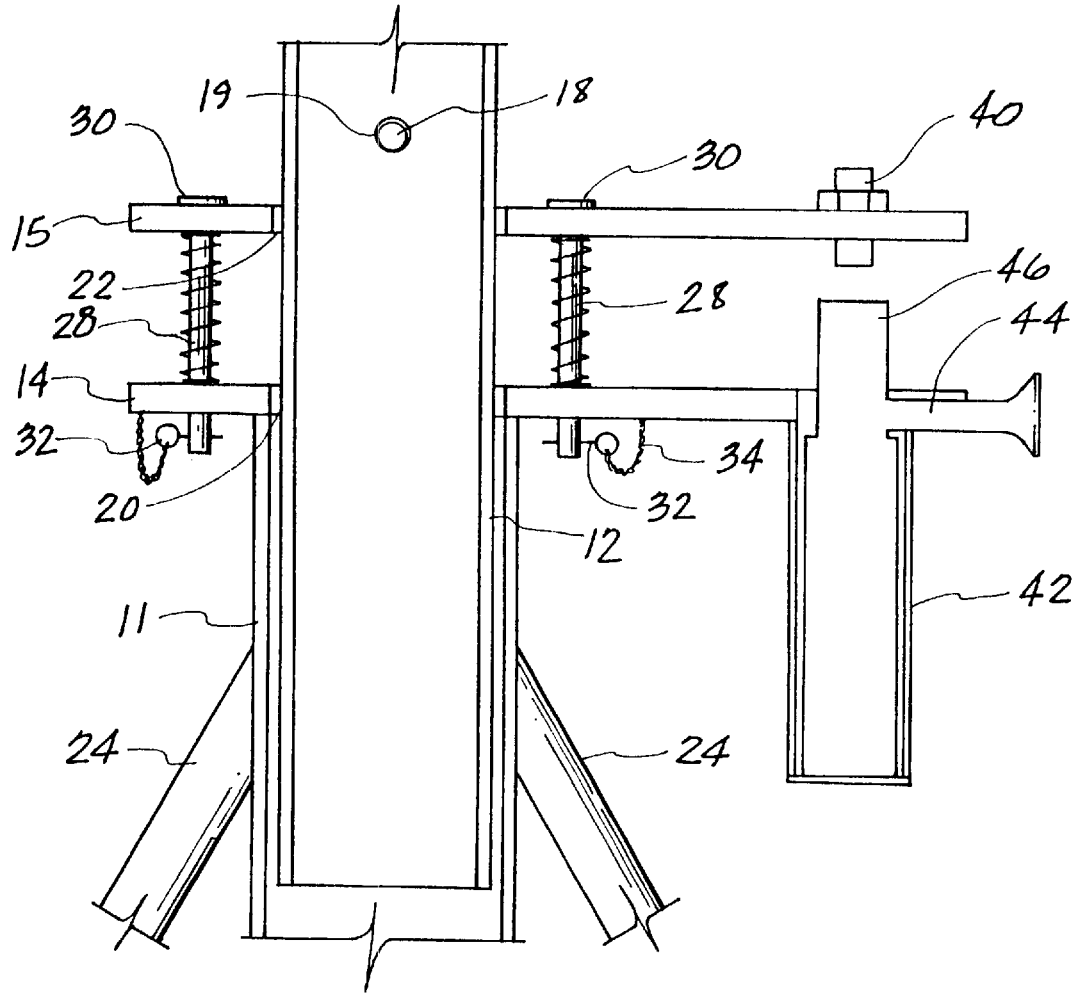

AIRCRAFT TAIL STAND WARNING SYSTEM

BACKGROUND OF THE INVENTION

The present invention relates to jack stands for aircraft and, more specifically, to a portable adjustable height tail stand which attaches to the tail skid of an aircraft and includes a warning system which notifies persons working on the aircraft that the tail stand is in danger of damaging the aircraft.

Aircraft, while on the ground, frequently require the use of a tail stand to prevent the aircraft from sitting down on its tail and damaging the fuselage of the aircraft. Most aircraft today are the tricycle gear design having two main gears and a nose gear, with the center of gravity of the aircraft located between the main gear of the aircraft and the nose gear. When a freight or passenger aircraft is being loaded, tail stands are always set in place so that if the center of gravity of the aircraft, due to the freight being loaded, momentarily shifts behind the main gears, the aircraft will attempt to sit down on its tail, which the jack tail stand prohibits. This use of such a tail stand is shown in the patent to Weiland et al., U.S. Pat. No. 3,051,419. Once aircraft are fully loaded, it is quite critical that the placement of the freight has not moved the overall center of gravity of the aircraft outside the flight envelope, which of course would render the aircraft dangerous to fly.

Other uses of the tail stands in aircraft for which the present invention is being used involve the construction stages of the aircraft and the maintenance thereof. With a single engine aircraft, when the engine is removed, the center of gravity (CG) of the aircraft shifts behind the main wheels and the aircraft must be supported by the tail stand. One manner in which this imbalance problem is handled would be by attaching a heavy weight to the nose of the aircraft once the engine is removed to retain the C.G. forward of the main wheels. Frequently during construction and maintenance, aircraft are elevated off their wheels by three hydraulic jacks that lift the aircraft at three hard points, one under each wing, and one at the nose. In this lifted position of the aircraft, the retractable landing gears can be cycled up and down for adjustment and maintenance as required.

During the construction of new aircraft, frequently the aircraft is held in an elevated position off the floor at the three points above mentioned, with the tail stand in place. The addition of various parts of the aircraft, such as engines and temporary testing equipment, may cause the center of gravity to shift behind the main wheels, which would cause the plane to tilt back on its tail stand.

A further condition the present invention is concerned with is when the aircraft is being lowered off the jacks, sometimes the tail stand has not been removed and as the aircraft is lowered, serious damage can be caused to the tail area of the empennage by forgetting to remove the tail stand. With the present invention, as soon as weight is transferred to the tail stand, a horn is activated.

DESCRIPTION OF THE PRIOR ART

Tail stands on aircraft have been widely used over the years such as in the patent to Weiland et al., U.S. Pat. No. 3,051,419, wherein a cargo plane is loaded from the rear which causes a temporary shifting of the center of gravity as the plane is loaded.

The patent to Evans, U.S. Pat. No. 4,378,098, illustrates another form of jack stands that are positioned both forward and aft on both sides of the aircraft during the loading and unloading of freight.

The patent to Pugh et al., U.S. Pat. No. 4,042,135, teaches a turnover moment sensing device for a crane which functions through strain gauges which senses the turnover moment of the crane caused by the offset nature of the load and the degree of extension. In essence, this warning device notifies the operator before the crane tips over through the use of strain gauges placed in the front axle.

The patent to Long, U.S. Pat. No. 5,445,352, teaches a portable telescoping stand for supporting pickup truck campers, which includes a theft warning device which senses when weight is removed from the stand which sets off an alarm.

DISCLOSURE OF THE INVENTION

The present invention is used in combination with newly constructed aircraft during various lifting and lowering stages during assembly and various testing stages. Those would include lifted stages where the aircraft was supported on jacks and the various landing gears were free to extend and retract in a simulated flight condition.

The tail stand of the present invention attaches to the tail skid of the aircraft or is positioned under the empennage section as a cradle, shaped to the under surface of the empennage. The tail stand prevents the tail of the aircraft from ever coming in contact with the ground and damaging the surrounding empennage area.

With the warning system of the present invention, if the tail of the aircraft begins to settle by reason of either lowering the aircraft from its jacks or sufficient aft center of gravity shift, the warning horn notifies the workers through a loud air horn that the tail stand is in danger of damaging the aircraft with any further lowering of the lifting jacks which are lowering the aircraft.

Therefore, the principal object of the present invention is to provide an aircraft tail stand with a very simple warning device when the tail stand is in danger of damaging the aircraft.

Other objects and a fuller understanding of the invention may be had by referring to the detailed description of the preferred embodiment in addition to the scope of the invention defined by the claims taken in conjunction with the accompanying drawings.

BRIEF DESCRIPTION OF THE DRAWINGS

FIG. 1 is a perspective view of the overall tail stand attached to the tail skid of an aircraft.

FIG. 2 is a perspective view to an enlarged scale of the center section of the tail stand.

FIG. 3 is a longitudinal section view taken through the center of the stand.

FIG. 4 is a plan view of another embodiment of the tail stand with a cradle type support.

DESCRIPTION OF THE PREFERRED EMBODIMENT

In reference now to the drawings and in particular to FIG. 1, the vertical tail stand of the present invention is generally described by reference numeral 10, which is shown attached to a tail skid 26 of an aircraft. The tail stand is also used to support a cradle type support as shown in FIG. 4.

The tail stand 10 comprises a stationary vertical center tube 11 supported by three lateral extending legs 24, which rests upon the ground. Slideably received in center tube 11 is a sleeve 12 which includes a series of longitudinally spaced lateral holes 19 which receive a removable locking pin 18 for varying heights of the aircraft off the ground.

Attached to the top of center tube 11 is a laterally extending stationary plate 14 having an opening 20 aligned with the opening in center tube 11. Positioned above plate 14 in spaced relation is a similar movable plate 15 having a similar opening 22, concentrically positioned over opening 20 for receipt of sleeve 12. Plates 14 and 15 are held apart by three or more springs 28 which are held against plates 14 and 15 by bolts 30. On the free end of bolts 30 are lateral holes in the bolts 30 which receive locking pins 32, as shown in FIG. 3. Pins 32 have cables 34 which connect to plate 14 to prevent loss of pins 32 once they are removed from bolts 30. Stationary plate 14 is welded to the top end of center tube 11 and concentrically aligned therewith. The outer end 54 of stationary plate 14 includes an opening 50 therein and a piece of tubing 42 welded thereto to provide a pocket for receipt of aerosol airhorn 44. Located on the top of airhorn 44 is an actuator button 46 which is contacted by an adjustable height bolt 40 mounted in the outer end 56 of movable plate 15, as seen in FIG. 3.

FIG. 4 illustrates a modified type of support with a fixed cradle 62 mounted on the upper end of sleeve 12. In this configuration the springs 28 need to be sufficiently strong to support the weight of cradle 62 and sleeve 12 without setting off horn 44. In this configuration the weight of the hanger and sleeve are not hanging on the aircraft, but rather being supported by the tail stand 10'.

OPERATION

Tail stand 10 is placed under the rear end of an aircraft in alignment with the tail skid 26, as shown in FIGS. 1 and 3. Sleeve 12 and connecting hangar 48 are lifted upward to engage and surround skid 26 and then pin 51 is inserted laterally through hanger support bracket 48 so as to support the sleeve and hanger on the rear end of the aircraft. Bolt 36 connects the hangar support bracket 48 to the sleeve 12. Removable locking pin 18 is then inserted in the closest hole 19 to movable plate 15, as illustrated in all the figures of the drawings. Sleeve 12 is free to move downwardly in the stationary center tube 11 until locking pin 18 comes in contact with movable plate 15. Any further downward movement of the aircraft tail will cause movable plate 15 to compress springs 28 and move bolt 40 into contact with the actuator button 46 of the horn, thus causing an audible alarm. Springs 28 are relatively light springs which are easily compressed by any downward movement of the aircraft tail. Once the alarm is noted, the tail stand can be either removed from under the tail of the aircraft or locking pin 18 can be removed thus allowing sleeve 12 to slide downward into the stand until the aircraft reaches contact with the ground. At any point when a load is exerted on the stand 10, the springs 28 will compress and the alarm horn 44 will be sounded, thereby preventing damage to the tail of the aircraft.

The tail stand 10 also functions in a situation where the tail stand 10 is in place and the aircraft is being loaded. If the loading of the aircraft causes the center of gravity to move aft of the main gear, the tail of the aircraft will begin to drop and the alarm horn will sound, thus notifying personnel that the aft CG condition exists and the tail stand is supplying a small amount of support to the rear of the aircraft, which is not a dangerous condition; however, increased aft loading can be.

Tail stand 10 is adjustable in height to fit various height tails of different aircraft by engaging the various holes 19 in sleeve 12. The contacting surface with the airplane can also be a cradle 62 as shown in FIG. 4 where the sleeve 12 is not hanging on the aircraft but rather is supported by the springs 28 on the stand.

The foregoing description is considered as illustrative only of the principles of the invention. Further, since numerous modifications and changes will readily occur to those skilled in the art, it is not desired to limit the invention to the exact construction and operation shown and described, and accordingly all suitable modifications and equivalence may be resorted to, falling within the scope of the invention which is defined only by the appended claims.

What is claimed is:

1. A tail support stand for aircraft which sounds an alarm when the tail lowers relative to the stand comprising:
   a stationary vertical stand which rests on the ground having a vertical passage there through;
   a sleeve having an aircraft engaging surface on the upper end thereof, the sleeve being slidable positioned in said vertical passage;
   a series of longitudinally spaced holes in said sleeve;
   a stationary plate attached to the top of the vertical stand with an opening surrounding the sleeve;
   a movable plate with an opening concentrically positioned over the stationary plate;
   biasing members positioned between said plates resisting movement of the movable plate;
   a removable pin positioned in one of the lateral holes of said sleeve;
   an audible horn positioned between the movable and stationary plates which is activated when the removable pin engages and moves the movable plate toward the stationary plate.

2. A tail support stand for aircraft, as set forth in claim 1, wherein the audible horn is activated by a can of pressurized gas having an actuator button on the top thereof.

3. A tail support stand for aircraft, as set forth in claim 1, wherein the stationary plate has an extension portion with a pocket formed therein for receipt of said horn.

4. A tail support stand, as set forth in claim 1, wherein the stationary and movable plates each have extension portions positioned one over the other, the extension of the stationary plate including a pocket for receipt of said audible horn and the extension of the movable plate including an adjustable height actuator bolt for actuating said horn.

5. A tail support stand, as set forth in claim 1, wherein the engaging surface is a hanger which attaches to the tail of the aircraft.

6. A stationary vertical stand including a ground supporting portion and a vertical center tube having a passage therethrough:
   a sleeve slidably received in the center tube;
   support means on the upper end of the sleeve;
   a series of longitudinally spaced holes in said sleeve;
   a movable plate with an opening therein concentrically positioned over the center tube;
   biasing members positioned between the movable plate and the center tube resisting movement of the movable plate;
   a removable pin positioned laterally in one of said spaced holes of said sleeve;
   an audible horn mounted on the vertical stand which is activated when the removable pin engages and moves the movable plate.

7. A tail support stand, as set forth in claim 6, wherein the vertical center tube has a laterally positioned stationary plate attached to the top of the center tube with an opening therein for receipt of said sleeve, the movable plate being concentrically positioned above the stationary plate and separated therefrom by said biasing members.

* * * * *